United States Patent
Oweis et al.

(10) Patent No.: US 6,399,238 B1
(45) Date of Patent: Jun. 4, 2002

(54) MODULE CONFIGURATION

(75) Inventors: Salah Oweis, Ellicott City, MD (US); Louis D'Ussel, Bordeaux (FR); Guy Chagnon, Cockeysville, MD (US); Michael Zuhowski, Annapolis, MD (US); Tim Sack, Cockeysville, MD (US); Gaullume Laucournet, Paris (FR); Edward J. Jackson, Taneytown, MD (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/459,455

(22) Filed: Dec. 13, 1999

(51) Int. Cl.[7] .................................................. H01M 2/10
(52) U.S. Cl. .......................... 429/99; 429/100; 429/120; 429/121; 429/159
(58) Field of Search ................................. 429/121, 159, 429/99, 100, 120, 175, 176

(56) References Cited

U.S. PATENT DOCUMENTS

| | | |
|---|---|---|
| 3,662,094 A | 5/1972 | Wetmore et al. |
| 4,109,064 A | 8/1978 | Warner et al. |
| 4,169,191 A | 9/1979 | Alt et al. |
| 4,539,272 A | 9/1985 | Goebel |
| 5,012,175 A | 4/1991 | Karna et al. |
| 5,061,579 A | 10/1991 | Ishimoto |
| 5,308,717 A | 5/1994 | Gordin |
| 5,378,555 A | 1/1995 | Waters et al. |
| 5,730,608 A | 3/1998 | Legrady |
| 5,853,915 A | 12/1998 | Suto |
| 5,977,746 A * | 11/1999 | Hershberger et al. ..... 429/99 X |
| 6,174,618 B1 * | 1/2001 | Nishiyama et al. ........... 429/99 |

FOREIGN PATENT DOCUMENTS

| | | |
|---|---|---|
| DE | G 94 04 070.2 | 6/1994 |
| EP | 0 905 803 A1 | 3/1999 |
| EP | 1 069 631 A1 | 1/2001 |

OTHER PUBLICATIONS

Patent Abstracts of Japan, Publication No. 09007564, Jan. 10, 1997, Hiroshi.
Patent Abstracts of Japan, Publication No. 10003899, Jan. 6, 1998, Kunihiko.

* cited by examiner

Primary Examiner—John S. Maples
(74) Attorney, Agent, or Firm—Sughrue Mion, PLLC

(57) ABSTRACT

A stand alone battery module including: (a) a mechanical configuration; (b) a thermal management configuration; (c) an electrical connection configuration; and (d) an electronics configuration. Such a module is fully interchangeable in a battery pack assembly, mechanically, from the thermal management point of view, and electrically. With the same hardware, the module can accommodate different cell sizes and, therefore, can easily have different capacities. The module structure is designed to accommodate the electronics monitoring, protection, and printed wiring assembly boards (PWAs), as well as to allow airflow through the module. A plurality of modules may easily be connected together to form a battery pack. The parts of the module are designed to facilitate their manufacture and assembly.

13 Claims, 12 Drawing Sheets

MODULE CONFIGURATION

BACKGROUND OF THE INVENTION

1. Field of the Invention

The present invention is directed to a stand alone battery module of juxtaposed electrochemical cells. A plurality of modules are in turn assembled together to form a battery pack. Although the cells may be of any type, lithium-ion cells are particularly suitable when the module is used in a battery pack for an electric vehicle.

2. Related Art

U.S. Pat. No. 5,378,555 to Waters et al. discloses an electric vehicle battery pack wherein a plurality of batteries are set in a supporting tray, and are mechanically connected together by interlocking plugs. The interlocking plugs include passages for electric connection between the batteries by cables, as well as for cooling tubes, and for wiring systems for the pack's electronic controllers. However, the battery pack disclosed in Waters includes the disadvantages of having a large volume and complex mechanical, electrical, as well as thermal connections, between the batteries in the battery pack.

SUMMARY OF THE INVENTION

An object of the present invention is to overcome the disadvantages of the prior art. Another object of the present invention is to provide a battery module for retaining a plurality of electrochemical cells for convenient use as a battery. Another object is to provide a battery module having component parts which are easy to manufacture. A further object is to provide a battery module which is easy to assemble. A further object of the present invention is to provide a simply designed battery module which can accommodate different sized cells while eliminating rattle, maintaining a proper thermal operating temperature, and simple electrical connections. A further object is to provide a battery module having decreased volume and weight.

The stand alone battery module of the present invention includes a configuration which reduces the overall volume of the module as well as facilitates the connection of a plurality of modules to form a battery pack. Further, the configuration of the module reduces the overall weight of the module, thereby increasing the power to weight and energy to weight ratios of the module as well as that of any battery pack in which it is included. Moreover, the parts which make up the module are designed to facilitate their manufacture, as well as facilitate assembly of the module.

The stand alone battery module of the present invention includes: (a) a mechanical configuration; (b) a thermal management configuration; (c) an electrical connection configuration; and (d) an electronics configuration. Such a module is fully interchangeable in a battery pack assembly, mechanically, from the thermal management point of view, and electrically. With the same hardware, the module can accommodate different cell sizes and, therefore, can easily have different capacities because Saft cells are designed with the same diameter but different lengths for different capacities. The module structure is designed to accommodate the electronics monitoring, protection, and printed wiring assembly boards (PWAs), as well as to allow airflow through the module. A plurality of modules easily may be connected together to form a battery pack. The battery pack is especially useful as a power source for an electric vehicle.

a) Mechanical Configuration

In the battery module of the present invention, a cell assembly is formed of a plurality of cells which are held between a pair of cell holding boards which in turn are connected by tie rods, for example. The cells are aligned so that their longitudinal axes are parallel with one another, and are perpendicular to the holding boards. The cell assembly is contained within a shell. An end cap is then attached to each holding board with a space between the end cap and holding board. Within each end cap there are two ports. On one side of the module, the ports in one end cap are for air intake, whereas the ports in the opposite end cap are for exhaust. On the intake side, the space between the end cap and the holding board is an air manifold. Because the ports in the end caps are similar, either end cap may be the inlet or exhaust side of the module.

Each holding board includes a first side, a second side, and a thickness therebetween. On the first side are a plurality of cavities which extend into the holding board, but to an extent less than the thickness of the holding board, so as to form a cavity bottom. The peripheral shape of each cavity matches the peripheral shape of the cell to be held therein. Preferably the cells and cavities have a circular peripheral shape as such provides good reduction in volume of the module due to the ease in nesting of the cells with one another. A plurality of cavities are aligned along the length of the holding board to form a first line. A second line includes a plurality of cavities which are staggered with respect to the cavities of the first line. A third line includes a plurality of cavities which are staggered with respect to the cavities of the second line, but are aligned with respect to the cavities of the first line. The foregoing arrangement of circular cavities allows the cells to easily nest with one another thereby reducing the overall volume of the module. Because the second line is offset from both the first and third line, it forms in the module a protrusion on one side and a recess on the other side. The protrusion and recess assist in locking modules together to form a battery pack having an overall reduced volume, as well as increased stability. That is, when the protrusion on one module is aligned with the recess on an adjacent module, the modules nest together, and are stably held with respect to one another while producing an overall minimum volume for the battery pack.

Within the periphery of each cavity there is a first through hole which accommodates a terminal of the cell held by the cavity. Some of the cavities also include a second through hole which accommodates a fill tube of the cell. The second through hole is in the cavities which hold the negative end of the cell because that end of the cell includes the fill tube. The cavity bottom may include a recessed portion to accommodate a terminal plate of the cell. Each cavity also may include a plurality of wedges around the periphery thereof. Each wedge may be shaped as a triangular web extending between the side wall and the cavity bottom. The wedges assist in holding a cell within a cavity of the holding board. By applying pressure and/or heat at the right places during assembly of the cells between the cell holding boards, the wedges are formed so as to eliminate rattle of the cell within the cavity, and accommodate variations in cell height.

Each holding board also includes a plurality of holes through the thickness thereof, but which are not located within the periphery of any cavity. Some of the through holes accommodate airflow through the holding board. This type of through hole may be of various sizes depending on its location relative to the cavities on the holding board, and may be of a slot type configuration, for example. This type of through hole, in conjunction with the openings in the end caps, provides an easy to manufacture mechanism for controlling the module's thermal management. Of course any other suitable shape may be used for the airflow through holes. Other through holes accommodate tie rods, or other suitable means, which extend between the pair of holding boards to attach the holding boards together with the cells therebetween.

The second side of each holding board includes lugs for the attachment of an end cap. Because the lugs are formed as a part of the holding board, a reduced number of separate parts is necessary for assembly of the module, which is thereby facilitated. The lugs may have various configurations depending on how the end cap and the holding board are connected. In a first configuration, the lugs include threaded inserts therein which receive screws. The screws are inserted through an end cap, and into the threaded insert in the lug, to form the connection. In a second configuration, the lugs include blind holes therein, into which rivets are inserted. The rivets are inserted through an end cap, and into the hole in the lug. The rivets are then expanded within the hole in the lug to form the connection. In a third configuration, the lugs include two portions. A first portion extends from the second side of the holding board. A second portion, slightly smaller in periphery than the first portion, extends from the first portion. Because the second portion is smaller in periphery than the first, a shoulder, or stepped, portion is formed to about against an end cap. The second portion is inserted through an aperture in an end cap so as to extend therefrom. Then, the second portion is heated and deformed, as by a plastic riveting process, to form the connection. In the first and second configurations, the height of the lugs determines the height of the air manifold, whereas in the third configuration, the height of the first portion does so. Thus, the lugs also provide an easy manner in which to connect the end caps to the holding boards, especially in the third embodiment, while also easily maintaining an accurate manifold height.

The second side of each holding board also includes recesses shaped to accommodate electrical bus connectors which extend between pairs of the cells. The recesses do not extend through the entire thickness of the holding board, but are deep enough so that the bus connectors are below the second side of the holding board. In such a manner, the holding board itself provides electrical insulation between the connectors, each of which extend between a pair of cell terminals. The holding board itself also provides insulation between the connectors and the cell cases which are negatively charged. Because the cell holding board provides the necessary insulation, separate insulating materials are eliminated thereby reducing weight of the module. Further, the recesses are shaped so as to accommodate a complementarily shaped bus connector. Thus, the cell holding boards serve as a template, or map, for making the electrical connections between the cells in the module. Because the recesses only accommodate a complementarily shaped bus connector, assembly of the module is facilitated.

The cell assembly, comprised of a plurality of cells held between two holding boards, is inserted in a shell, and then the end caps are attached to the holding boards. The shell is dimensioned so that it is slightly shorter than the distance between the end caps after they have been attached to the holding boards. In such a manner, the shell does not receive any stress load applied to the end caps. That is, the shell is allowed to "float" between the end caps. Therefore, the shell may be made thin thus further reducing the weight of the module. Moreover, the thin shell has a simple overall shape which can easily be manufactured. Because the end caps take a force load, they may include stiffening ribs on a surface thereof.

In another embodiment, only one holding board is provided. With this arrangement the module does not stand alone, but is used as part of a battery pack.

b) Thermal Management Configuration

In the module, the cells are spaced from one another by a cell-to-cell distance measured between the outer periphery of one cell and the outer periphery of an adjacent cell. The cells adjacent the shell are spaced therefrom by a cell-to-shell distance. The temperature difference between the inner surface (at an inside diameter of a cell having a hollow core) and an outer surface (at an outside diameter of a cell having a hollow core) of each cell is $\Delta T$. An end cap is attached to each holding board with a space between the end cap and holding board. Within each end cap there are two ports. On one side of the module, the ports in one end cap are for air intake, whereas the ports in the opposite end cap are for exhaust. On the intake side, the space between the end cap and the holding board is an air manifold.

1) First Embodiment of the Module Thermal Management Configuration:

A battery module arrangement wherein uniform air velocity within the module is attained. To attain uniform air velocity distribution at all gaps between cells as well as between cells and the shell inside wall, an air intake manifold is designed—both analytically and experimentally—with 2 ports of air intake on the intake end cap; each port having a set of openings with specially selected geometry and size on the side wall and the bottom. The air intake velocity distribution is controlled by the size and location of each intake port, the height of the air manifold created between the end cap inner surface and the top surface of the cell board, the size as well as geometry and location of each opening on the side wall and/or bottom of each air intake port. As a nonlimiting example, the manifold and intake ports are designed so that intake air entering at 5 m/s leaves on the exhaust side of the module at velocities ranging between 3.5 and 4.5 m/s measured at the exhaust point of cell-to-cell or cell-to-shell gaps. This has been verified experimentally for a selected manifold design. The air manifold, which is easily and accurately formed by the connection between the cell holding board and end cap, allows the control of the temperature within the cell by controlling the air flow rate.

2) Second Embodiment of the Module Thermal Management Configuration:

A battery module arrangement wherein uniform temperature distribution across each cell is attained. To attain uniform temperature distribution, the manifold height is minimized while still accommodating the cells, necessary hardware, and cell-to-cell connectors. The air intake ports do not need to include any specialized shape. The cell-to-cell and cell-to-shell distances were experimentally and analytically selected to maintain a uniform velocity of air through the cell assembly with a minimum pressure drop across the module and minimum air flow rate.

Because there is no specialized shape necessary for the air intake ports, there is no dedicated air intake and exhaust. That is, either side of the module may be the intake/exhaust, and air can flow through the module in either direction. With the above configuration, each cell within the module can be maintained at a predetermined $\Delta T$ depending on the intake air flow rate.

c) Module Electrical Connector Configuration

There are two types of electrical connector within the module. A first type of connector extends between cells of the module. A second type of connector extends between common potentials of the electrically connected group of cells in the module and the desired load application outside of the module.

The first type of connector is an electrically conductive bus connector. Each bus connector is a strip of material having a first end and a second end. There is a hole on each the first end and the second end to accommodate a cell terminal stud. The first type of connector may be either straight, or include a curved section. The shapes of the connectors are complementary to the shape of the recesses in the cell holding boards to ensure that the cells are properly connected. A flag terminal is attached between the first and second ends of the strip. The flag terminal provides a simple connection between the module cells and the module electronic control system. The connectors are treated for anti-corrosion. Because of their configuration, the bus connectors are easily made. Moreover, because of the simple connection provided by the flag terminal on the bus connector, assembly of the module is facilitated.

The second type of connector, a power connector, includes an L-shaped electrically conductive block. In the end of a first leg of the L-shaped block there is a blind threaded hole. The first leg extends through a square hole in an end cap of the module to enable connection to the threaded hole from outside of the module. The second leg of the L-shaped block includes a through hole in a side face thereof. A wire is connected to the hole in the second leg, and to a tab connection. The tab connection is then connected to the common potential of all the cells within the module.

d) Module Electronics Configuration

The module includes an electronic control system which is connected to the cells within the module so as to monitor voltage and temperature of each cell. Also, the electronic control system is used for communication with other modules, as well as cell balancing during the charge cycle of the module.

BRIEF DESCRIPTION OF THE DRAWINGS

The above and other objects and advantages of the present invention will become more apparent by describing in detail preferred embodiments thereof with reference to the accompanying drawings, wherein:

FIGS. 12a–f show a power connector of the present invention, wherein FIG. 12a is a perspective view including a cable attached to one embodiment of the power connector, and FIGS. 12b–c are top and side views of the power connector as shown in FIG. 12a, and FIGS. 12d–f show, respectively, plan, top and side views of a second embodiment of the power connector;

FIGS. 15a–c show views of a second embodiment of cell holding board, wherein FIG. 15a shows a top view, FIG. 15b shows a cross sectional view taken along the line II—II of FIG. 15a, and FIG. 15c is a perspective view.

DETAILED DESCRIPTION OF THE INVENTION

Figure 1:
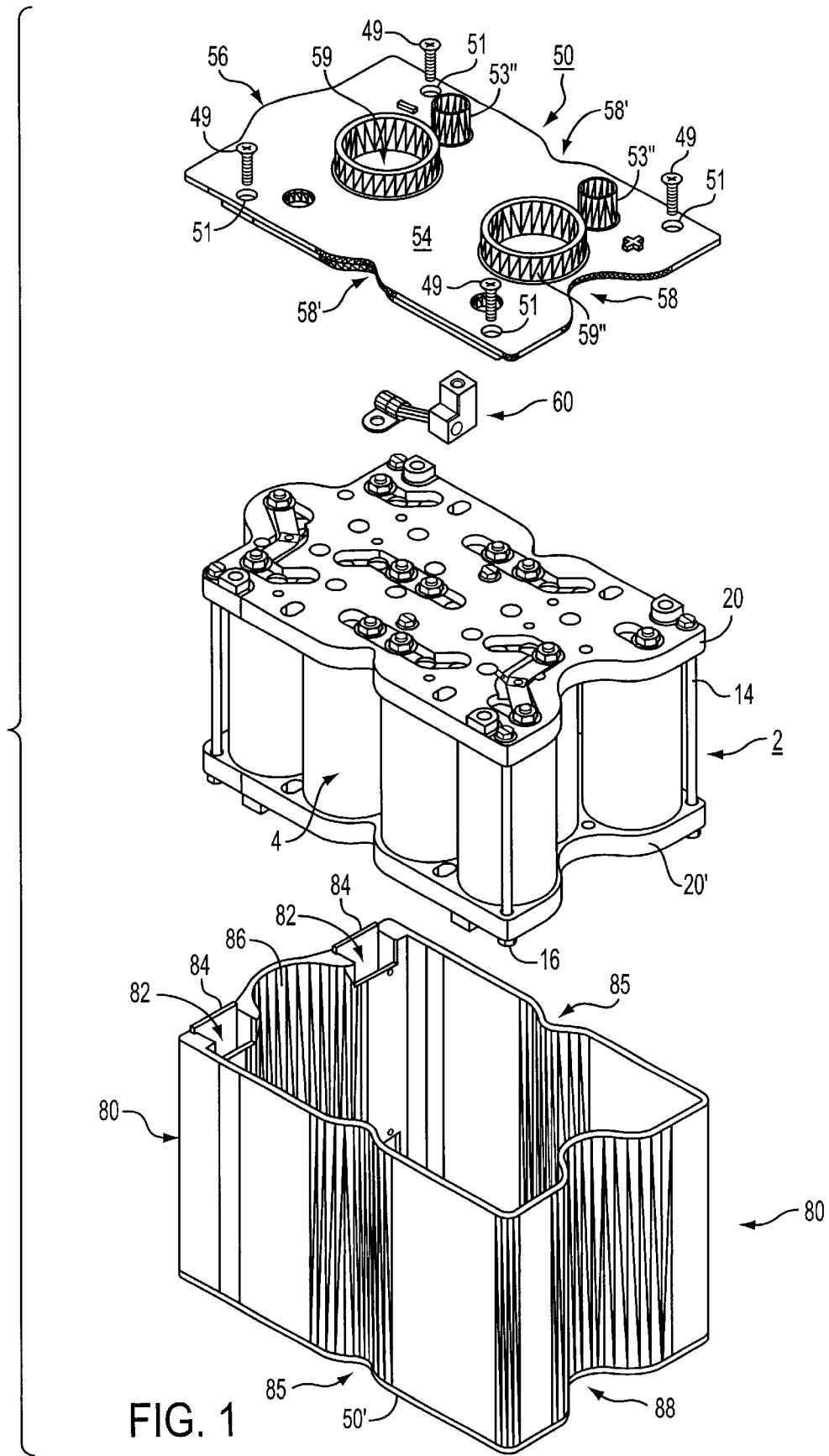
FIG. 1 is an exploded perspective view of the module of the present invention.

As shown in FIG. 1, the module of the present invention includes a cell assembly 2 which is inserted in a shell 80 which, in turn, is closed by end caps 50, 50'.

The cell assembly 2 is formed of a plurality of cells 4 which are held between a pair of cell holding boards 20, 20' which, in turn, are connected by tie rods 14 and nuts 16. The cells 4 are cylindrical and are aligned so that their longitudinal axes are parallel with one another, and are perpendicular to the holding boards 20, 20'. The cells 4 are aligned in three staggered rows such that they nest to reduce the overall volume of the module.

The cell assembly 2 is contained within a shell 80. End caps 50, 50' are then attached to the holding boards 20, 20' with a space between each end cap 50, 50' and a respective holding board 20, 20'. The end caps 50, 50' and holding boards 20, 20' each include similar protrusions on one end and recesses on an opposite end. The protrusions of the end caps 50, 50' and holding boards 20, 20' are received in a protrusion accommodation portion 86 of the shell 80 so as to from a protrusion on one end of the module. The recesses of the end caps 50, 50' and holding boards 20, 20' receive indentation 88 in the shell 80. Thus, the module includes a recess at an end thereof opposite to that on which the protrusion is located. The protrusion of one module may thus easily be received in the recess of an adjacent module thereby interlocking the modules for a secure connection between the modules of a battery pack. Further, overall volume of the battery pack is reduced because adjacent modules interlock.

The shell 80 is dimensioned so that it is slightly shorter than the distance between the end caps 50, 50' after they have been attached to the holding boards 20, 20'. With such an arrangement, the shell 80 does not receive any stress load applied to the end caps 50, 50'. That is, the shell 80 is allowed to "float" between the end caps 50, 50'. Therefore, the shell 80 may be made thin thus reducing the weight of the module. Because Saft cells are designed with the same diameter but different lengths for different capacities, the capacity of the module can easily be varied by merely varying the length of the shell 80 and that of the tie rods 14 which hold the cell holding boards 20, 20' on either side of the cells 4.

Figure 4:
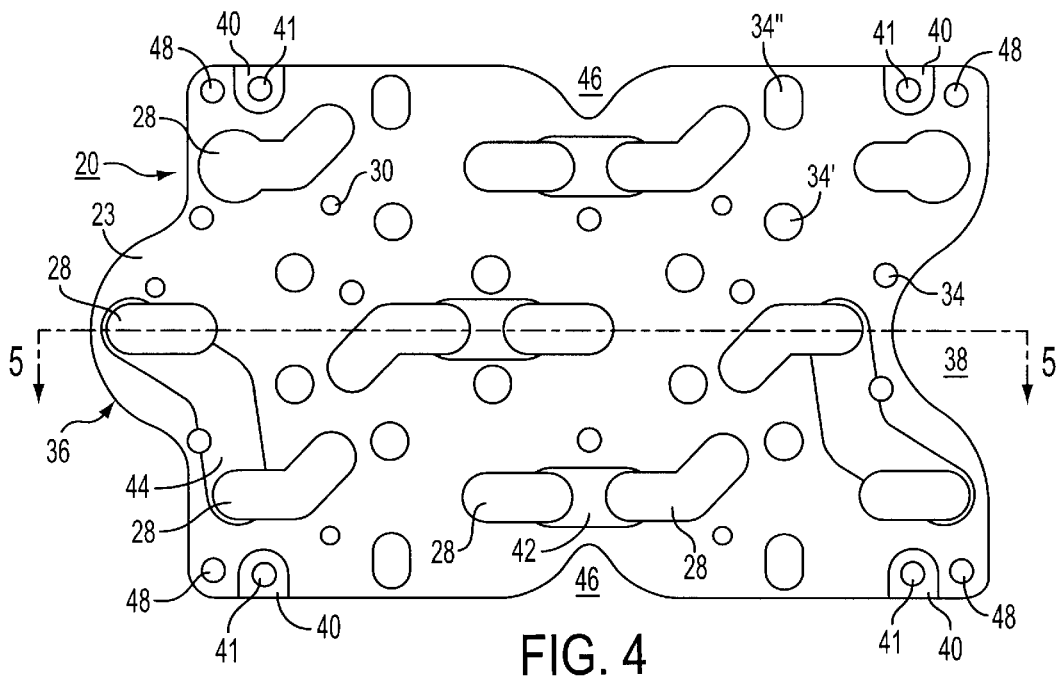
FIG. 4 is a top view of the intake cell holding board of FIG. 2.
Figure 5:
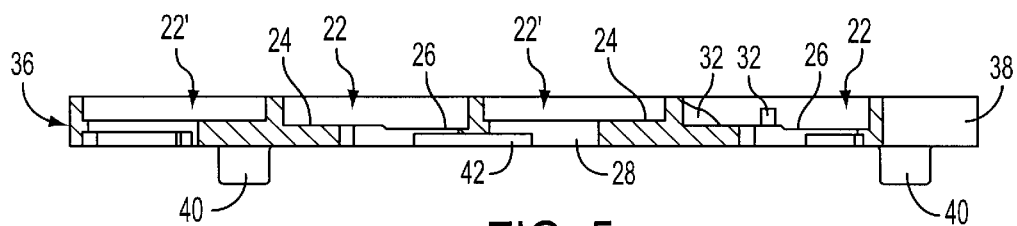
FIG. 5 is a cross sectional view of the intake cell holding board as taken along lines I—I of FIG. 4.
Figure 9:
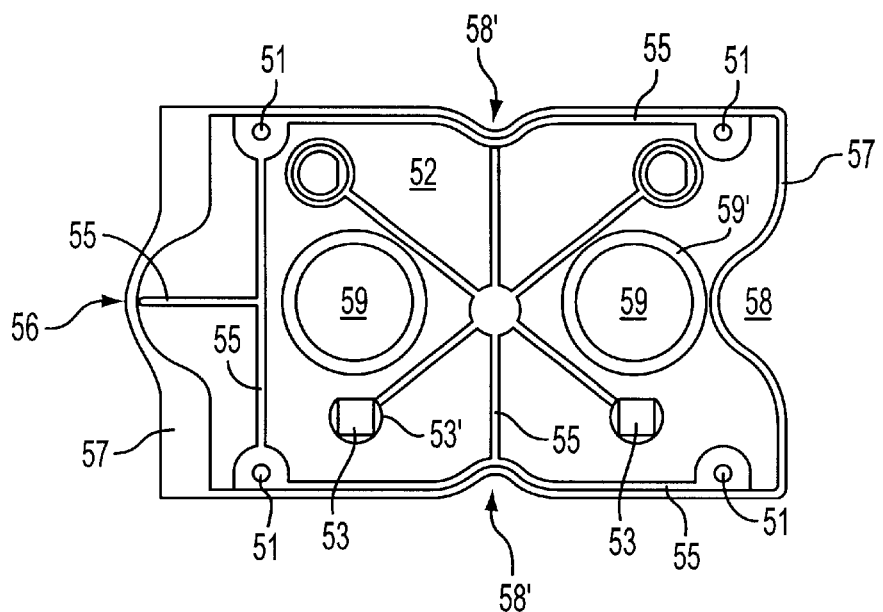
FIG. 9 is a bottom view of the intake end cap as shown in FIG. 8.
Figure 10A:
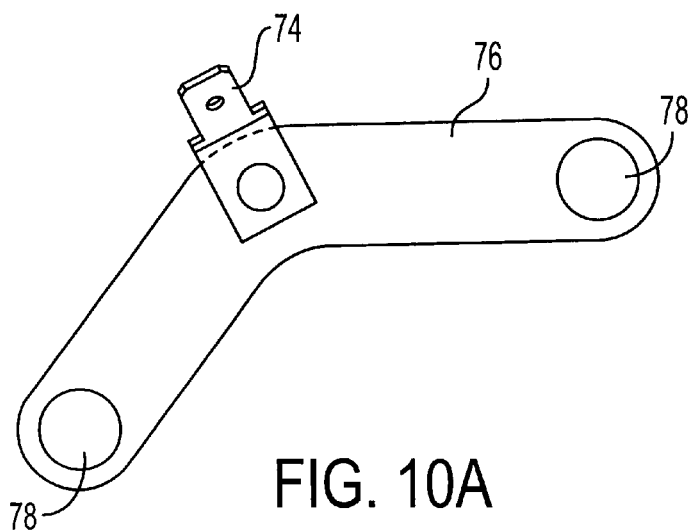
FIGS. 10a–c are top, perspective, and side views of a long bus connector according to the present invention.
Figure 10B:
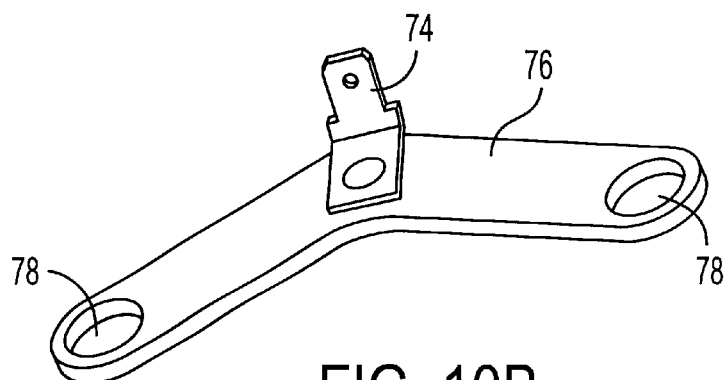
Figure 10C:
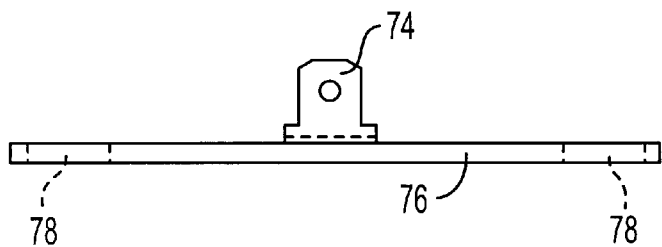
Figure 11A:
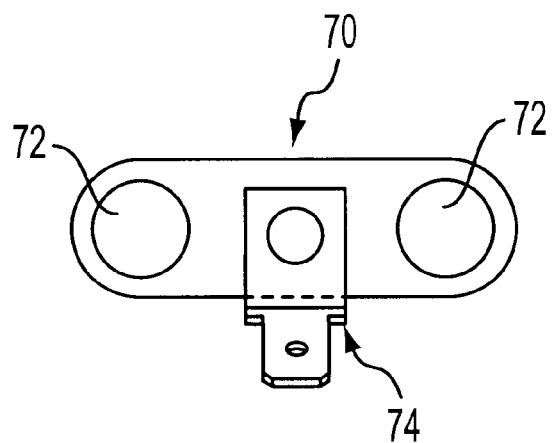
FIGS. 11a–c are top, perspective, and side views of a short bus connector according to the present invention.
Figure 11B:
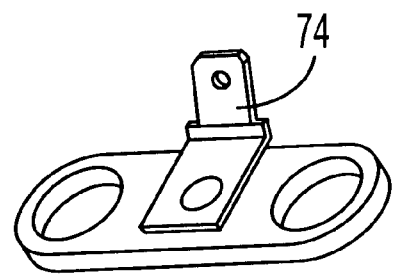
Figure 11C:
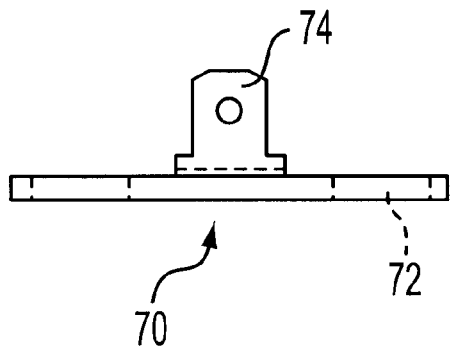

Additionally, the cell holding boards 20, 20', and end caps 50, 50' include similar recesses 46, and 58', respectively, along each longitudinal side. See FIGS. 4 and 9. The shell 80 includes corresponding indentations 85 which are received in the recesses 46, of the cell boards 20, 20', as well as in the recesses 58' of the end caps 50, 50'. The foregoing arrangement reduces the weight of the cell boards 20, 20' and end caps 50, 50' while at the same time strengthening the shell 80.

Each of the parts which make up the module will now be described in further detail.

Cell

Figure 13:
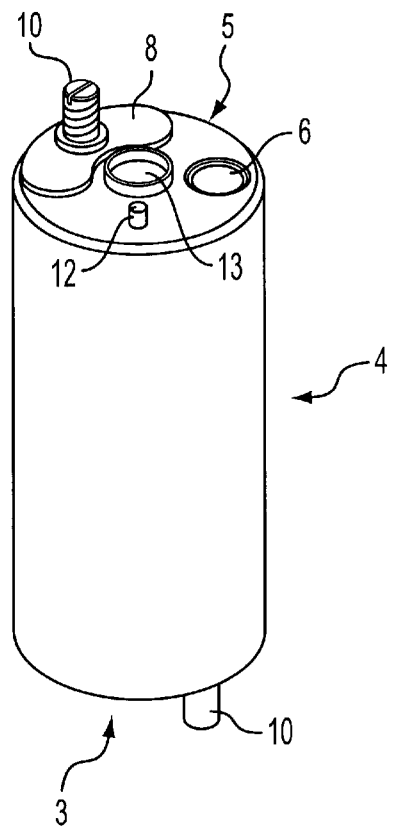
FIG. 13 shows a perspective view of an electrochemical cell.

A preferred embodiment of an electrochemical cell for use in the module is shown in FIG. 13. Each electrochemical cell 4 includes a positive end 3 and a negative end 5. The negative end 5 of the cell includes a safety vent 6, a terminal plate 8, a threaded stud 10, and a fill tube 12. The safety vent 6 allows the escape of excess pressure that builds up within the cell. The terminal plate 8, serving as a current bus, is connected to the negative electrode (not shown) within the cell 4, and to the threaded terminal stud 10. The threaded stud 10 is then used to connect the cell to other cells within the module, or to a power connector 60 of the module. The fill tube 12 is used, during the manufacture of the cell, for inserting electrolyte within the cell casing. Further, the cell may have a hollow core 13 to assist in the thermal management of the module. The cell 4 may be of any desired type, for example, a rechargeable lithium-ion cell. Saft cells are designed with the same diameter but different lengths for different capacities.

Cell Holding Boards

The intake cell holding board 20 and exhaust cell holding board 20' have a similar, complementary, structure and, therefore, only the intake cell holding board 20 is shown, and described in detail with reference to FIGS. 2–6.

The cell holding board 20 includes a first side 21 and a second side 23 opposite to the first side 21, with a thickness therebetween.

The first side 21 of the holding board 20 includes a plurality of cavities 22 and 22' therein. Each of the cavities 22, 22' includes a bottom 24, and a periphery. Each of the cavities 22 includes a through hole 28, a through hole 30, and a recess 26 within the periphery thereof to accommodate the structure on the negative end of an electrochemical cell 4. The through hole 28 accommodates threaded terminal stud 10, the through hole 30 accommodates fill tube 12, and recess 26 accommodates terminal plate 8. Only the cavities 22' need to include respective through holes 28 to accommodate respective threaded terminal studs 10 on the positive sides of the cells. Additionally, both types of cavity 22, and 22' may include webs 32 formed between the bottom 24 and a side wall around the periphery of the cavity 22, 22'.

The webs 32 accommodate variations in cell height as well as prevent rattling of the cells within the cavities 22, 22' of the holding boards. That is, after all the cells of a module have been placed between the holding boards 20, 20', in respective cavities, force and possibly heat are applied to the holding boards to push them together. When the holding boards are pushed together with the cells 4 therebetween, the webs 32 of a particular cavity deform to the particular cell placed within that cavity. For example, if a cell 4 in one cavity is slightly taller than a cell in a second cavity, the webs of the one cavity will deform more than those in the second cavity thereby maintaining a uniform spacing between the cell holding boards 20, 20' even though the cells are of a different height. Further, the webs 32 prevent rattle of the cells within the cavities, when a cell has a slightly smaller diameter than that of a the cavity in which it is placed, by providing a variable effective diameter for the cavity. Although only one of each type of cavity 22, 22' is shown as including webs 32, all the cavities in the holding board preferably include webs 32. Further, although in one cavity three webs are shown, each cavity can have any suitable number of webs.

The second side of the holding board 20 includes recesses 42 and 44 for accommodating the bus connectors 70 and 76, respectively. The recesses 42, 44 extend from the through hole 28 of one cavity to the through hole 28 of an adjacent cavity and are positioned depending on how the cells 4 of the module are to be connected, i.e., in series, parallel, or a combination thereof. Because the recesses determine how the cells are connected, the holding boards serve as a template, or map, which facilitates assembly of the module. Additionally, the recesses 42, 44 extend below the second side 23 of the holding board to an extent greater than, or equal to, the thickness of the bus connectors 70, 76. By such an arrangement, the cell holding board 20, itself, provides insulation between the bus connectors 70, 76 of the module. Therefore, no additional insulation is needed, and the module weight is reduced. Moreover, the thickness of the cell holding board is such that the portion between the recesses 42, 44 and the cavities provides sufficient insulation between the bus connectors 70, 76 and the electrochemical cells 4 whose outside containers are negatively charged in a lithium-ion cell, for example. Again, because the cell holding board 20 itself provides sufficient insulation, no additional insulation is necessary, thus the weight of the module is reduced and manufacture is simplified.

Additionally, the second side of the cell holding board 20 includes lugs 40 for connecting the holding board 20 to an end cap 50. Because the lugs 40 are formed with the holding board 20, the number of separate parts is reduced thereby simplifying assembly of the module. Although four lugs 40 are shown, any suitable number may be used. Each of the lugs 40 includes a structure which facilitates attachment of the end cap 50 to the holding board 20 while also accurately maintaining a space therebetween for use as an air manifold in thermal management of the module.

Figures 14A, 14B:
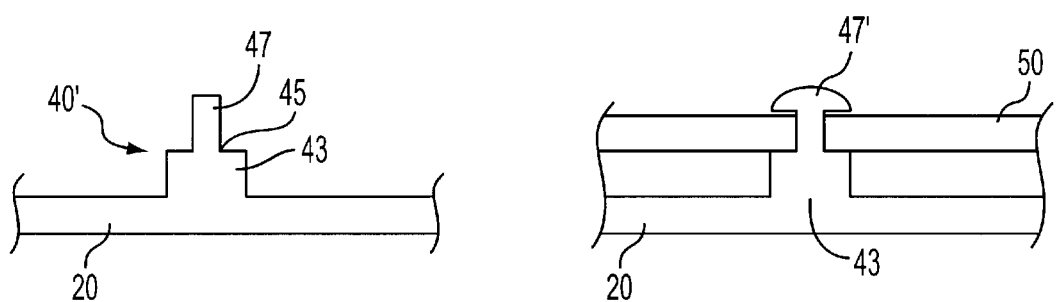
FIGS. 14a–d show side views of first to third embodiments of a lug for connecting a cell holding board to an end cap according to the present invention.
Figure 14C:
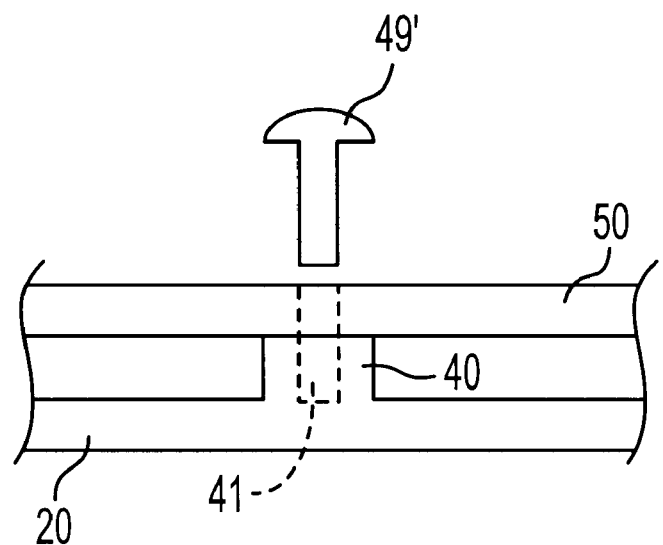
Figure 14D:
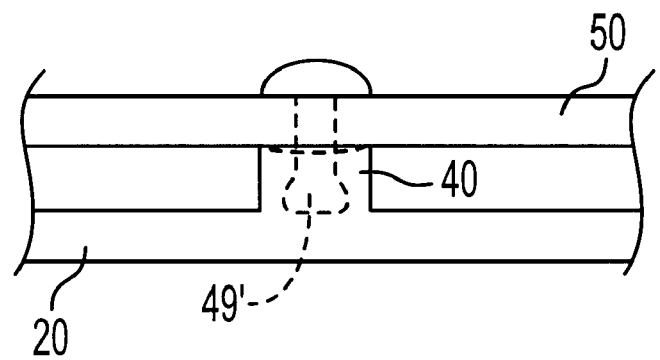

In a first embodiment, as shown in FIGS. 14c–d, the lugs 40 extend from the cell holding board 20, and contain holes 41 in the ends thereof. The holes 41 are sized to receive rivets 49' therein. After the rivets 49' are inserted into the holes 41, the ends of the rivets 49' are expanded in the holes 41 to securely attach the end cap 50 to the cell holding board 20. The rivets 49' may be those typically known as "pop rivets". In a second embodiment, the holes 41 are screw threaded so as to receive screws 49 therein. The screws 49 are inserted through apertures 51 in the end cap 50 and into the holes 41 to securely attach the end cap to the cell holding board 20. In the first and second embodiments, the end cap 50 rests on the lugs 40, so that the height of the lugs easily and accurately determines the height of the air manifold between the end cap 50 and the cell holding board 20.

In a third embodiment, as shown in FIGS. 14a–b, lugs 40' have a special shape. A first portion 43 of the lug extends from the cell holding board 20. A second portion 47 extends from the first portion 43. The second portion 47 has a smaller periphery than that of the first portion 43 so as to form a stepped portion 45 at the junction of the first portion 43 and second portion 45. The lugs 40' of the third embodiment are arranged so that the second portion 47 fits through the apertures 51 in the end cap 50 which then rests on the stepped portion 45. Thus, in the third embodiment of the lugs, the height of the stepped portion 45 above the second side 23 of the holding board 20 easily and accurately determines the height of an air manifold between the holding board 20 and the end cap 50. To secure the end cap 50 to the holding board 20, the second portion 47 is deformed, as by heat stake riveting for example, to form a head 47' which is larger than aperture 51. The head 47' then prevents the end cap 50 from coming off of the lug 40' on the cell holding board 20. The third embodiment is preferred for its ease and speed in assembling the module.

Further, the cell holding board 20 includes through holes 34, 34', 34" which are not within the periphery of any cavity 22, 22'. The through holes 34, 34', 34" accommodate fluid flow through the cell holding board 20. The through holes 34, 34', 34" are spaced and sized so that when taken together with the cell-to-cell spacing, cell-to-shell spacing, and air manifold height, a desired thermal management configuration for the module is achieved. The through holes 34, 34', 34" are shown as circular and oblong, however, any suitable shape may be used.

Moreover, the cell holding board 20 includes through holes 48 which receive tie rods 14 when the cell assembly 2 is formed. That is, tie rods 14 extend through a through hole 48 in the intake cell holding board 20 as well as a through hole 48 in exhaust cell holding board 20' to thereby hold the cell holding boards together with the electrochemical cells 4 therebetween.

Figure 2:
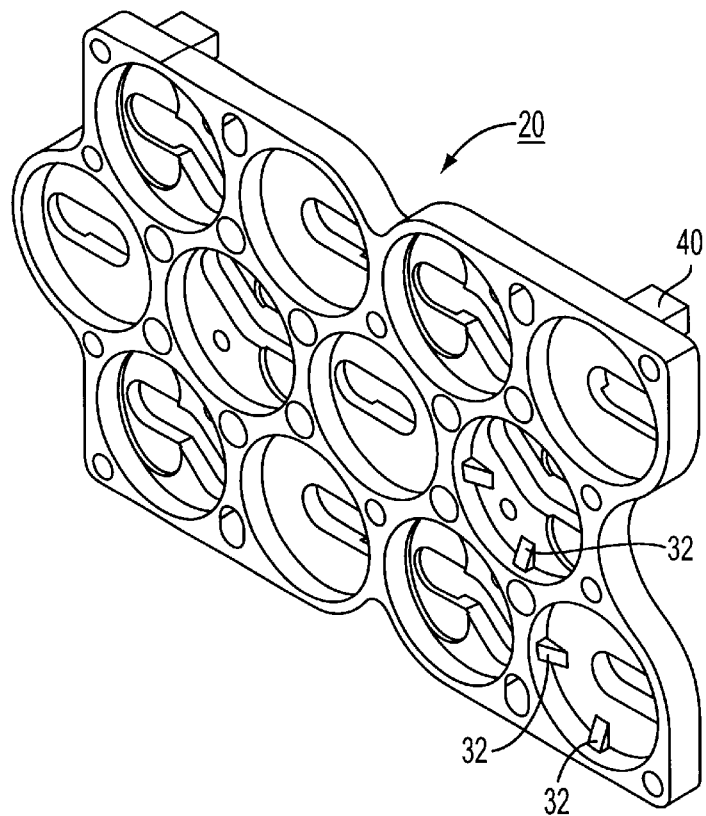
FIG. 2 is a bottom plan view of an intake cell holding board according to the present invention.
Figure 3:
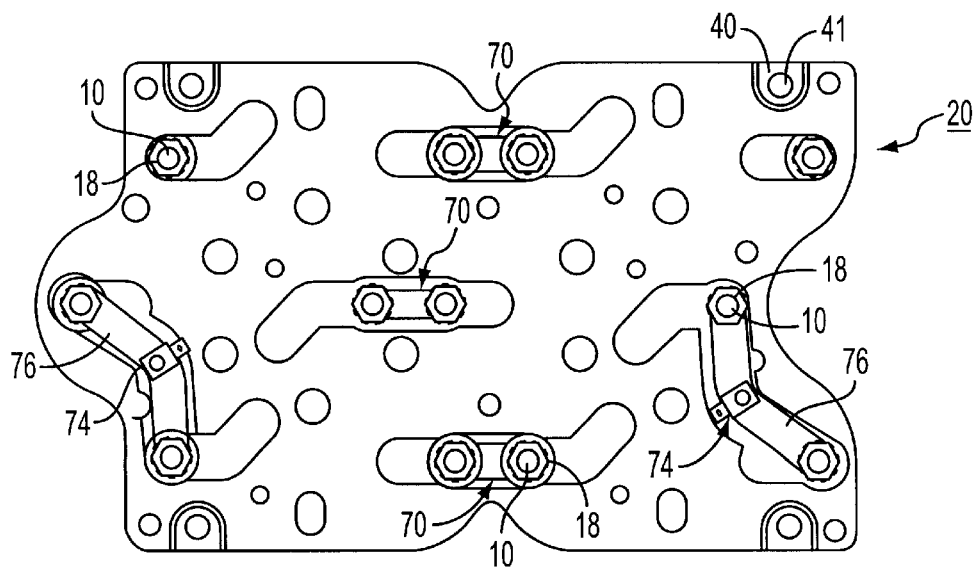
FIG. 3 is a top view of the intake cell holding board of FIG. 2 having electrochemical cells and bussing connectors attached thereto.
Figure 6:
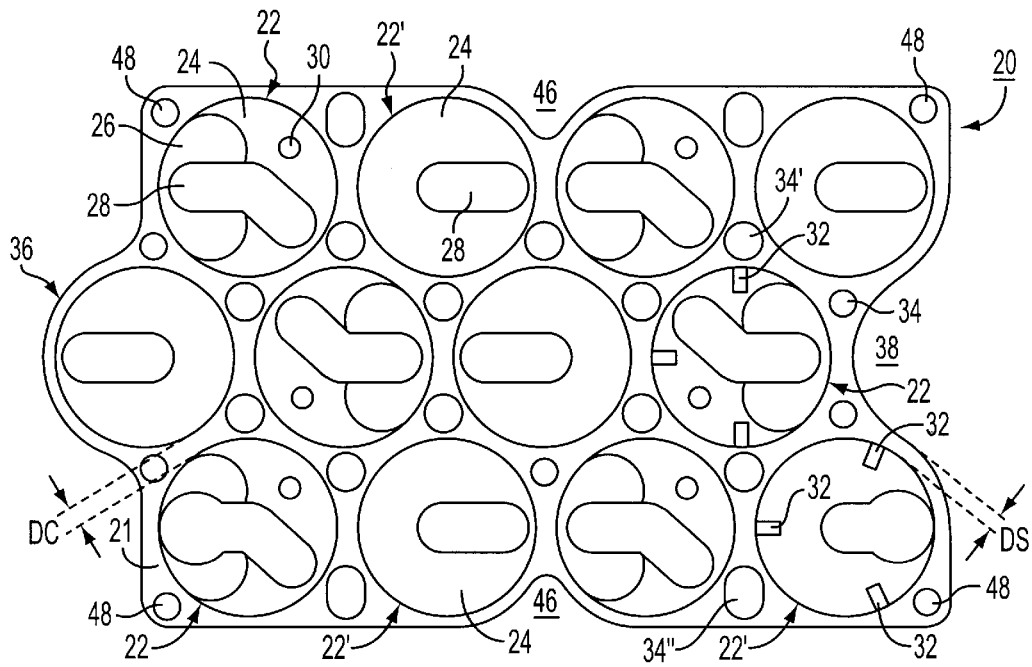
FIG. 6 is a bottom view of the intake cell holding board of FIG. 2.

In addition to the special surface characteristics of the cell holding board 20, it has an overall shape which assists in the manufacture and assembly of the module. The cell holding board 20 includes a protrusion 36 on one end, and a recess 38 on an opposite end, thereof. The protrusion 36 accommodates a portion of one cavity which is offset on the one end of the cell holding board 20. The recess 38 is formed on the opposite end of the cell holding board 20 as is protrusion 36, and is aligned therewith to facilitate nesting of modules when more than one is used, as in a battery pack. That is, a first line of cavities extends along an edge of the cell holding board which includes recess 46, and includes four cavities as shown in FIGS. 2 and 6, for example. Although each line is shown as having four cavities, any suitable umber may be used. A third line of cavities extends along an opposite edge of the cell holding board, and a second line of cavities is formed between said first line and said second line. The second line is offset from the first and third lines which are aligned with each other. As shown in FIGS. 2 and 6, the second line is offset to the left thereby producing protrusion 36 and recess 38. The cavities of the second line are offset, and in a nesting arrangement, with respect to both the first line and third line so as to achieve a compact arrangement of cells 4 and, thereby, a compact module having minimum volume. The cavities in each of the first through third lines may be either 22 or 22'. In the embodiment shown, cavities 22 and 22' alternate in each of the lines—such an arrangement being useful in connecting the cells 4 of the module in series.

The main differences between the cell holding boards will now be described. First, the cavities on cell holding board 20' have an opposite configuration from corresponding cavities on cell holding board 20. That is, a cavity 22 on cell holding board 20' would correspond to a cavity 22' on cell holding board 20 to hold a cell 4 therebetween, in the cell assembly 2. Similarly, a cavity 22' on cell holding board 20' would correspond to a cavity 22 on cell holding board 20 to hold a cell 4 therebetween. Thus, when the positive end of a cell 4 is held by a cavity 22' on one holding board, 20' for example, the corresponding cavity on the other cell holding board 20 would be a cavity 22 for holding the negative end of the cell 4. In such a manner, the cells 4 are held so as to be perpendicular to both the holding boards 20, 20', and are held in such a manner that they can be easily connected to one another. Thus, the cavities serve as a template, or map, of how the cells are inserted within the cell assembly thereby facilitating assembly of the module.

Figure 7:
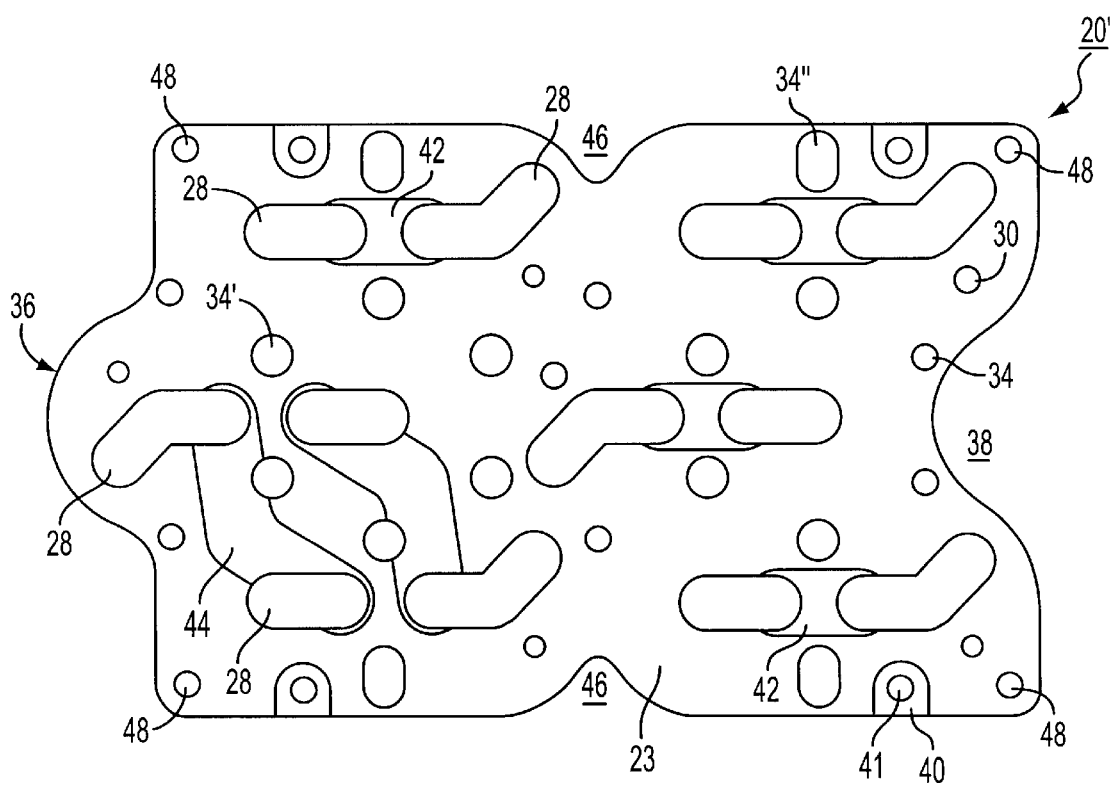
FIG. 7 is a bottom view of an exhaust cell holding board according to the present invention.

Also, the recesses 42, 44 of the holding board 20' would not be in the same positions as those shown for holding board 20, but would be in positions complementary thereto, depending upon how the cells in the module are connected. In a preferred embodiment, the recesses 42, 44 of the holding board 20' are positioned as shown in FIG. 7.

In the cell assembly 2, the cells 4 are held within cavities 22, 22' in the holding boards so that threaded terminal studs 10 of the cells 4 extend through holes 28 and through recesses 42, 44. An appropriate bus connector 70, 76—that is, one having a complementary shape to the recess in which it is placed—is then placed in each of the recesses 42, 44, so that the terminal studs 10 are received in its holes 72, 78. A nut 18 is then threaded onto the each of the terminal studs 10 to lock the bus connector 70, 76 in place thereby completing an electrical connection between the cells 4. Because the recesses 42, 44 have a shape that is complementary to that of the respective bus connectors 70, 76, the cell holding board serves as a template for placement of the connectors, which facilitates assembly of the module. Further, because one type of bus connector 70, 76 can only fit in one type of complementarily shaped recess 42, 44, respectively, proper connection of the cells 4 is ensured.

Figure 15A:
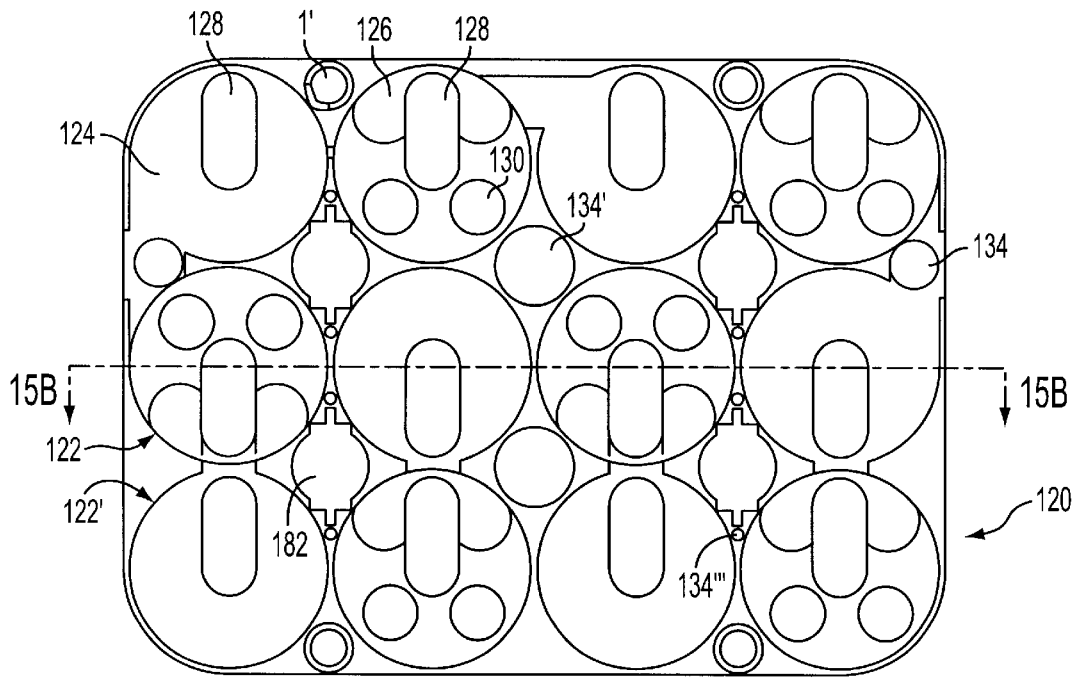
Figure 15B:
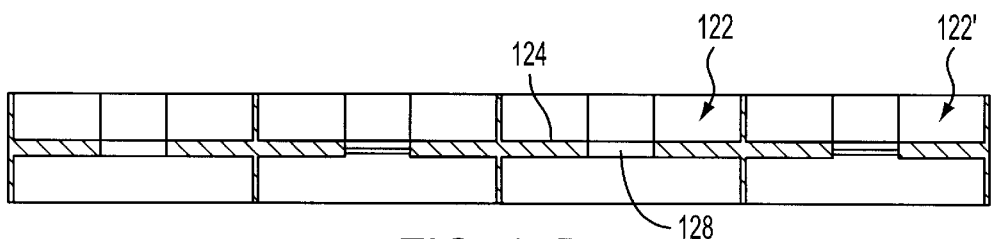
Figure 15C:
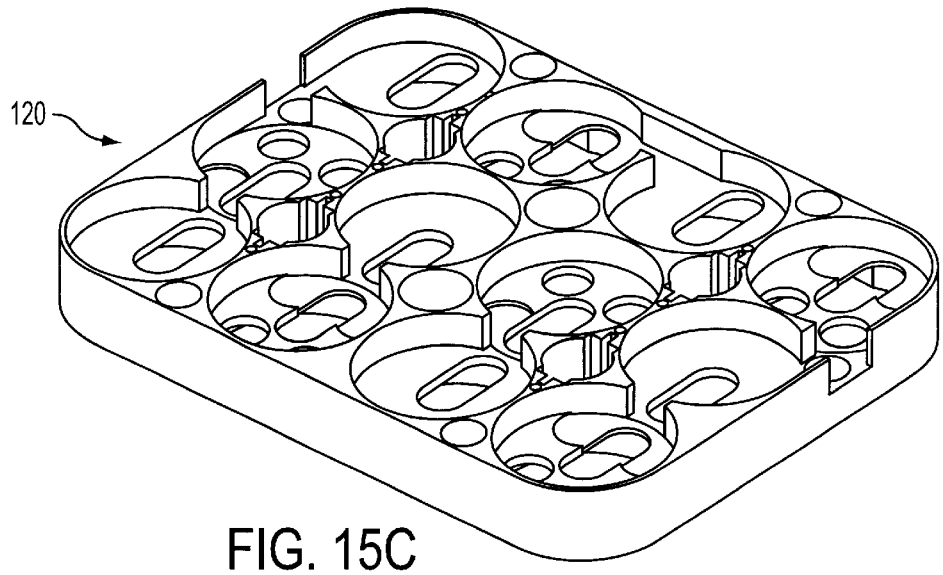

A second embodiment of cell holding board is shown in FIGS. 15A–C. Elements of the second embodiment of the cell holding 120 board which are similar to like elements of the first embodiment are labeled with similar reference numerals, i.e., with one hundred added thereto. Similarly to the cell holding boards of the first embodiment, the cell holding board 120 includes cavities 122 and 122' therein. The cavities 122 include a cavity bottom 124 and a recess in the cavity bottom 124. Further, the cavities 122 include through holes 130 for the cell fill tube and vent. Both types of cavities 122 and 122' include a through hole for accommodating the cell terminal stud and, although not shown, may contain webs to assist in holding the cells in place. Additionally, the cell holding board includes very small through holes 134''', small through holes 134, and larger through holes 134'. The function and purpose of these holes is the same as in the first embodiment. The cell holding board 120 also includes through holes 148 for accommodating tie rods and the like to hold cell holding boards together.

Different from the first embodiment, the cell holding board 120, is designed to be used without a shell and, therefore, an electronic system accommodating portion 182 is formed therein. Further different from the first embodiment, the rows of cavities are not staggered with respect to one another but, instead, are aligned side-by-side. This arrangement of the rows of cavities allows the module to have less volume than that of the first embodiment. A module having this type of cell holding board is not typically a stand alone module because there is no shell. However, a shell could be used with this embodiment of cell holding board, as in the first embodiment.

In another embodiment, only one cell holding board is used. In this embodiment, the module does not stand alone, but is used as a part of a battery pack. Either of the above-described first and second embodiments of cell holding board may be used in this manner.

Bus Connectors

The bus connectors 70, 76 form a part of the electrical connector configuration within the module. At least two types of bus connectors, a short bus connector 70 and a long bus connector 76, are used to connect the ends of adjacent cells 4 together. That is, for example, when the cells are connected in series, one connector would extend between the positive end of one cell and the negative end of an adjacent cell 4. Alternatively, the connectors may be used to connect the cells of the module in parallel. Moreover, depending on the desired module voltage and current output, a combination of series and parallel connections may be made within the module by bus connectors 70, 76.

The short bus connector 70 includes holes 72 at each end thereof. Each of the holes 72 accommodates a threaded stud 10 of an electrochemical cell 4. A flag connector 74 may be attached to the bus connector 70 between the holes 72. The flag connector 74 facilitates connection of the bus connector 70, and thus the cells 4, to the electronic control system of the module. Short bus connectors 70 have a complementary shape to, and are thus accommodated within, recesses 42 in the cell holding boards 20, 20'.

The long bus connector 76 includes holes 78 at the ends thereof. Each of the holes 78 accommodates a threaded stud 10 of an electrochemical cell 4. A flag connector 74 may also be attached to the long bus connector 76 between holes 78. The long bus connector includes a bend intermediate its ends to facilitate connection between electrochemical cells in different lines within the module. Long bus connectors 76 have a complementary shape to, and are thus accommodated within, recesses 44 in the cell holding boards 20, 20'.

The bus connectors 74, 76 are attached to the cell assembly 2 in the following manner. A threaded terminal stud 10 of an electrochemical cell 4 extends through one hole 28 in a cell holding board 20 and is adjacent a recess, 42 for example, on the second side of the cell holding board 20. A second threaded terminal stud 10 of a second electrochemical cell 4 extends through an adjacent hole 28 in the cell holding board 20, and extends so as to be adjacent the opposite end of the recess 42. Short bus connector 70 is placed in the appropriate recess 42 so that the terminal studs 10 of the adjacent cells 4 extend through the holes 72 of the bus connector 70. A nut 18 is then threaded onto each of the terminal studs 10 so as to form an electrical connection between the two cells 4. The long bus connector 76 is used in a similar manner. Many such connections are made on both the intake cell holding board 20 and the exhaust cell holding board 20' which serve as templates, or maps, for the placement of the connectors 70, 76. Moreover, the two types of bus connectors 70, 76 are easy to manufacture, and are the only two types necessary to connect all the cells 4 within a module. Therefore, the assembly of the module is facilitated by a reduction in the number of different parts required.

Power Connectors

Power connectors 60 form a second part of the electrical connector configuration within the module. A power connector 60 is connected to a common potential within the module. That is, one power connector 60 is connected to the positive potential of the cell assembly 2 whereas another power connector 60 is connected to the negative potential of the cell assembly 2. Each power connector 60 is then used to connect the module to a desired application, i.e., to other modules thereby forming a battery pack, or to a load. The power connector 60 may have any suitable shape, however, an L-shaped connector is preferred.

Each L-shaped power connector 60 includes a first leg 61, and a second leg 65 which is perpendicular to the first leg. The first leg 61 is inserted within one of the holes 53 in the end cap 50 of the module. The first leg 61 includes a blind hole 62 therein. The blind hole 62 includes threads 63 to facilitate connection of the power connector 60, and thus the module, to a desired application. At least a portion of the second leg 65 includes a through hole 64. The through hole 64 extends in a direction perpendicular to that in which the blind hole 62 extends. A cable 68, having a tab 69 connected at a first end thereof, facilitates connection of the L-shaped power connector to a common potential within the module. The tab 69 includes a hole 69' therein sized to accommodate a threaded stud 10 of an electrochemical cell 4. The tab may then be secured to the threaded stud 10 using a nut 18, for example. A second end of the cable 68 is attached within the through hole 64. The connector 60 thus provides a simple structure, taking up little room in the module and adding little weight thereto, for connection between the cells in the module and a desired application outside the module.

The shape of the power connector 60 facilitates manufacture and assembly of the module. That is, the first leg 61 of power connector has a shape which is complementary to that of the holes 53 in the end cap 50 of the module to thereby easily prevent rotation of the power connector with respect to the end cap. For example, both the first leg 61 and the holes 53 may be rectangular so that when a bolt is screwed into the blind hole 62, the connector 60 does not rotate. Of course any other suitable shape which prevents rotation, for example a star shape, is possible. Further, when the first leg 61 is inserted within a hole 53 in the end cap, the second leg 65 prevents the power connector from falling through the hole 53. That is, the second leg 65 acts as a stop which abuts the first side 52 of the end cap 50. Moreover, the edges of the connector 60 may be beveled as at 66 to facilitate insertion within a hole 53, and to reduce stress risers.

Figure 12A:
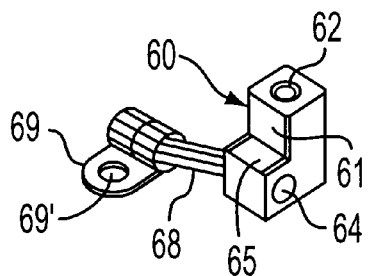
Figure 12B:
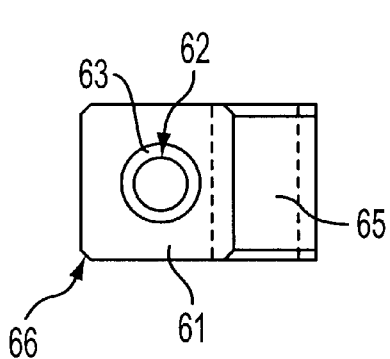
Figure 12C:
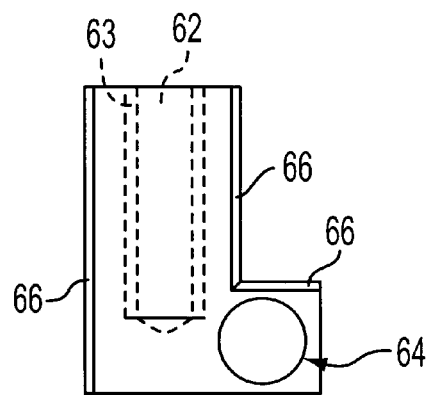
Figure 12D:
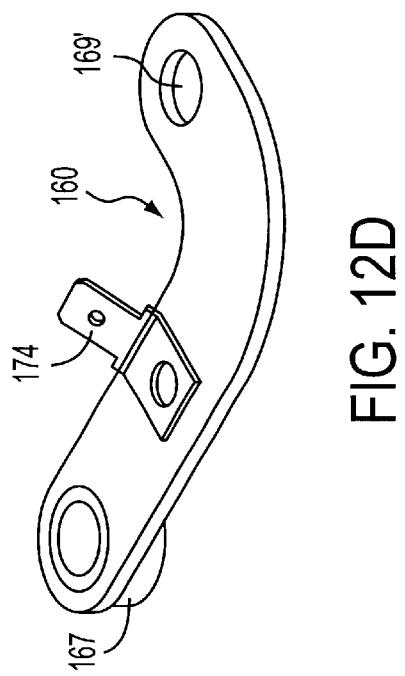
Figure 12E:
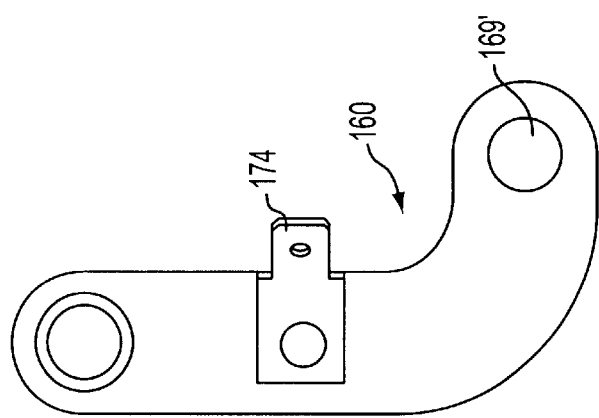
Figure 12F:
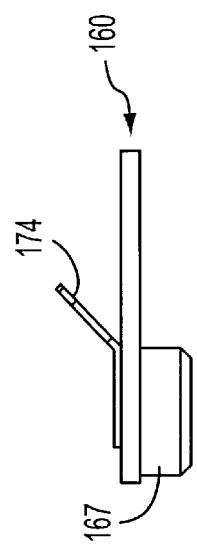

A second embodiment of power connector is shown in FIGS. 12*d–f*. This version of the power connector is used to connect one module to another module, and is particularly useful with the second embodiment of cell holding board. The power connector 160 includes a hole 169' to accommodate a threaded stud of an electrochemical cell, and a nut 167 that is attached to a neighboring module. The nut 167 is press fit to the body of the power connector 160. Further, the power connector 160 includes a flag terminal 174 so that connections for measuring voltage, and other module parameters, may conveniently be made.

Module End Caps

Figure 8:
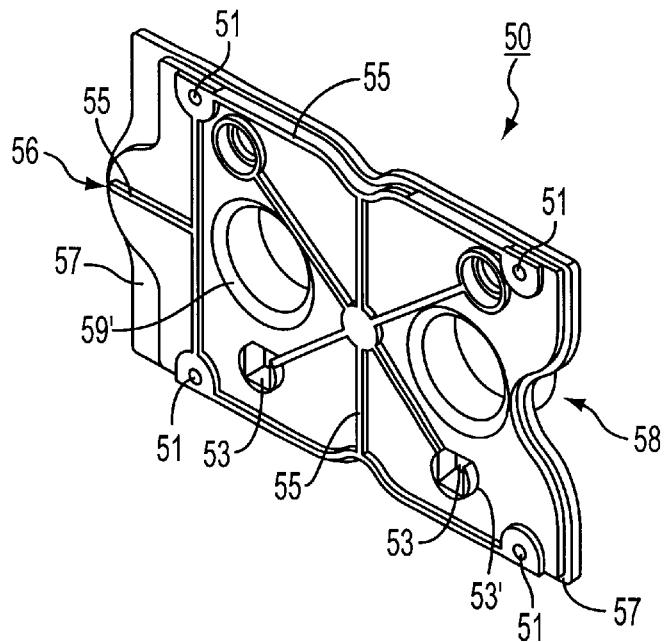
FIG. 8 is a bottom plan view of an intake end cap according to the present invention.

There are two cell end caps in the module—an intake end cap 50, and an exhaust end cap 50'. The end caps are similar and, therefore, only the intake end cap 50 is shown and described in detail. See FIGS. 1, 8, and 9.

End cap 50 includes a first side 52, which faces the interior of the module, and a second side 54 which faces the exterior of the module. Apertures 51 extend from the first side 52 to the second side 54 for forming a connection between the end cap 50 and cell holding board 20. Although four apertures 51 are shown, any suitable number can be used. The end cap 50 further includes holes 53 therein for accommodating power connectors 60 which are connected to the common potentials within the cell. The holes 53 have a shape which is complementary to that of the power connectors 60 so as to prevent rotation of the power connectors 60 when a desired load is being attached. Each hole 53 includes a rim 53' on the first side of the end cap 50, and another rim 53" on the second side 54 of the end cap 50. The rim 53' does not extend entirely around the hole 53 but allows an open space for second leg 65 thereby ensuring that the power connector 60 is positioned correctly within the hole 53. That is, the power connector 60 can only be inserted within the hole 53 in one manner, i.e., so that one leg 65 of the connector extends within the opening formed in the rim 53'. Correct positioning of the power connector 60 ensures that the cable 68 attached thereto extends in the proper direction for connection to the cells within the module. The main difference between end caps 50, 50' is that only one need include holes 53, and rims 53' 53" for the power connectors 60.

Because the shell 80 is shorter than the distance between the end caps 50, 50' when they are attached to the cell assembly, the end caps 50, 50' receive all axial force which acts on the module. Therefore, the end caps 50, 50' include stiffening ribs 55 to prevent deformation. By including stiffening ribs 55, the remaining portion of the end cap can be made thin, thereby reducing overall weight of the module, yet still ensuring that the end caps can withstand axial forces.

Further, the end cap 50 includes a protrusion 56 on one end thereof, and a recess 58 on an opposite end thereof. The protrusion 56 and recess 58 are of a shape complementary to that of protrusion 36 and recess 38 of the cell holding board 20, as well as to that of protrusion accommodating portion 86 and indent 88 of the shell 80. Moreover, the end cap 50 includes a recess 57 around the periphery thereof to accommodate the shell 80. Because the end of the shell is received in recess 57, inward deformation thereof is prevented thereby strengthening the module. The recess 57 is made wider on one end of the end cap 50 in order to accommodate the electronic system accommodating portions 82 within the shell 80. By having the above configuration, the end cap 50 is easily aligned with, and mated to, the cell assembly 2 and shell 80.

Additionally, the end cap 50 includes ports 59 for the intake or exhaust of heat exchanging fluid from the module. Each port 59 includes a beveled portion 59' where it meets the first side 52 of the end cap 50, and includes a rim 59" extending from the second side 54 of the end cap. The beveled portion 59' assists in fluid flow to or from the interior of the module, whereas rim 59" may be used to connect the module to a fluid circulation system. On one side of the module, the ports 59 in one end cap 50 are for air intake, whereas the ports 59 in the opposite end cap 50' are for exhaust. On the intake side, the space between the end cap 50 and the holding board 20 is an air manifold. Because the ports 59 in the end caps 50, 50' are similar, either end cap 50, 50' may be the inlet or exhaust side of the module, i.e., the air flow can easily be reversed.

Shell

As shown in FIG. 1, shell 80 includes an overall shape which is complementary to that of the cell assembly 2, holding boards 20, 20', and end caps 50, 50', to facilitate assembly of the module. That is, one end of the shell includes a protrusion accommodating portion 86, whereas the opposite end of the shell 80 includes an indentation 88. The protrusion accommodating portion 86 encloses the protrusions 36 of the cell holding boards 20, 20', as well as receives the protrusions 56 on the end caps 50, 50'. The indentation 88 is shaped so as to fit within the recesses 38 of the cell holding boards 20, 20', as well as mate with the recesses 58 in the periphery of the end caps 50, 50'. Additionally, the shell 88 includes indentations 85 in the longitudinal sides thereof to mate with indentations 46 in the cell holding boards 20, 20' and with similar indentations 58' in the end caps 50, 50'. The indentations 85 in the sides of the shell assist in giving the shell rigidity in order to facilitate handling thereof during assembly and handling of the module. That is, the shell is thin and, therefore, may be easily flexed during handling thereof, however, the indentations 85 provide a stiffening effect.

Further, the shell 80 includes an electronic control system accommodating portion 82. Although the electronic control system accommodating portion 82 is shown as being adjacent to the protrusion accommodating portion 86, it may be located at any suitable spot within the module. The accommodating portion 82 includes a sliding cover 84 for allowing easy access to the electronic control system within the accommodating portion 82. The electronic control system (not shown) forms the electronics configuration of the module, and may be of any suitable type for monitoring voltage and temperature of the cells. Further it is preferable that the electronic control system includes circuitry for communicating with other modules as well as for cell balancing during the charge cycle of the module. The electronic control system is connected to the cells through the use of the flag connectors 74. For example, the preferred electronic control system is that described in copending U.S. application Ser. No. 09/350,375, filed on Jul. 9, 1999, which is hereby incorporated by reference.

Thermal Management Configuration

In the module, the cells 4 are spaced from one another by a cell-to-cell distance measured between the outer periphery of one cell and the outer periphery of an adjacent cell. The cell-to-cell distance is exemplified by the distance DC between adjacent cavities in the cell holding board 20. See FIG. 6. The cells 4 which are adjacent the shell 80 are spaced therefrom by a cell-to-shell distance. The cell-to-shell distance is exemplified by the distance DS between a cavity in cell holding board 20 and the nearest edge of the holding board 20. Again, see FIG. 6. The temperature difference between the inner surface (at an inside diameter of a cell 4 having a hollow core 13) and an outer surface (at an outside diameter) of each cell is $\Delta T$. An end cap is attached to each holding board with a space between the end cap and holding board. Within each end cap there are two openings 59. On one side of the module, the openings in one end cap 50 are for air intake, whereas the openings 59 in the opposite end cap 59' are for exhaust. On the intake side, the space between the end cap 50 and the holding board 20 is an air manifold.

1) First embodiment of the module thermal management configuration:

The battery module is arranged so that uniform air velocity within the module is attained. To attain uniform air velocity distribution at all gaps between cells 4 as well as between cells 4 and the inside wall of the shell 80, an air intake manifold is designed, both analytically and experimentally, with two ports 59 of air intake on the intake end cap 50; each port 59 having a set of openings with specially selected geometry and size on the side wall and the bottom. The air intake velocity distribution is controlled by the size and location of each intake port 59, the height of the air manifold created between the end cap 50 inner surface 52 and the top surface 23 of the cell board 20, the size as well as geometry and location of each opening on the side wall and/or bottom of each air intake port 59. The through holes 34, 34' and 34" in the cell holding boards 20, 20', are sized as well as shaped and located so as to maintain the air intake velocity distribution created by the intake ports 59 and manifold. As a non-limiting example, the above configuration is designed so that intake air entering at 5 m/s leaves on the exhaust side of the module at velocities ranging between 3.5 and 4.5 m/s measured at the exhaust point of the cell-to-cell or cell-to-shell gaps. This has been verified experimentally for the shown module design. The air manifold allows the control of the temperature within the cell by controlling the air flow rate.

2) Second embodiment of the module thermal management configuration:

The battery module is arranged so that uniform temperature distribution across each cell 4 is attained. To attain uniform temperature distribution, the manifold height is minimized while accommodating the cells 4, hardware and cell-to-cell bus connectors 70, 76. The air intake openings 59 do not need to include any specialized shape. The cell-to-cell and cell-to-shell distances, as shown, were experimentally and analytically selected to maintain a uniform velocity of air through the cell assembly 2 with a minimum pressure drop across the module, and with a minimum air flow rate.

Because there is no specialized shape necessary for the air intake openings 59, there is no dedicated air intake and exhaust end of the module. That is, either side of the module may be the intake/exhaust, and fluid can flow through the module in either direction. With the above configuration, each cell 4 within the module can be maintained at a predetermined ΔT depending on the intake air flow rate.

Although preferred embodiments of the present invention have been described above, it is contemplated that numerous modifications may be made to the module of the present invention without departing from the spirit and scope of the invention as defined in the following claims.

We claim:

1. An electrochemical cell module comprising:
   a cell assembly including a plurality of electrochemical cells connected by a plurality of electrical connectors,
   at least one cell holding board for retaining the cells at a predetermined spacing, said at least one cell holding board having:
     a first surface, a second surface opposite to said first surface,
     wherein said first surface includes a plurality of cavities therein for receiving the electrochemical cells,
     wherein said plurality of cavities includes a first type shaped for receiving a negative end of an electrochemical cell and a second different type shaped for receiving a positive end of an electrochemical cell,
     wherein said second surface includes a plurality of recesses therein for receiving said plurality of electrical connectors; and
   said holding board including a plurality of holes therein for directing fluid flow in order to maintain a uniform temperature distribution within each cell.

2. An electrochemical cell module according to claim 1, comprising a second cell holding board having a plurality of cavities therein, said plurality of cavities in said second cell holding board including said first type shaped for receiving the negative end of an electrochemical cell and said second type shaped for receiving the positive end of an electrochemical cell, said second cell holding board being arranged opposite to said first cell holding board so that a cavity of said first type in said first cell holding board is opposite a cavity of said second type in said second cell holding board.

3. An electrochemical cell module according to claim 1, wherein said holding board, for retaining electrochemical cells, comprises:
   a first end having a protrusion extending therefrom; and
   a second end, opposite to said first end, having a recess formed therein, wherein said recess includes a shape which is complementary to that of said protrusion.

4. An electrochemical cell module comprising:
   a cell assembly including a plurality of electrochemical cells connected by a plurality of electrical connectors,
   at least one cell holding board for retaining the cells at a predetermined spacing, said at least one cell holding board having:
     a first surface, a second surface opposite to said first surface,
     wherein said first surface includes a plurality of cavities therein for receiving the electrochemical cells,
     wherein said second surface includes a plurality of recesses therein for receiving said plurality of electrical connectors;
     wherein said plurality of recesses includes a first type of recess having a first shape, and a second type of recess having a second shape which is different than said first shape;
   said plurality of electrical connectors, for connecting the cells, includes a first type of connector having a shape complementary to said first shape, and a second type of connector having a shape complementary to said second shape; and
   said holding board including a plurality of holes therein for directing fluid flow in order to maintain a uniform temperature distribution within each cell.

5. An electrochemical cell module comprising:
   a cell assembly including a plurality of electrochemical cells connected by a plurality of electrical connectors,
   at least one cell holding board for retaining the cells at a predetermined spacing, said at least one cell holding board having:
     a first surface, a second surface opposite to said first surface,
     wherein said first surface includes a plurality of cavities therein for receiving the electrochemical cells,
     wherein said second surface includes a plurality of recesses therein for receiving said plurality of electrical connectors;
   said holding board including a plurality of holes therein for directing fluid flow in order to maintain a uniform temperature distribution within each cell; and
   wherein a first end cap is attached to a first end of said cell assembly, a second end cap is attached to a second end of said cell assembly, and a shell is located between said first end cap and said second end cap.

6. An electrochemical cell module according to claim 5, wherein said shell has a height which is less than the distance between said first end cap and said second end cap.

7. An electrochemical cell module according to claim 5, wherein said first end cap has at least one fluid intake port therein and is attached to said cell holding board so as to form a fluid manifold therebetween.

8. A holding board, for retaining electrochemical cells, comprising:
   a first end having a protrusion extending therefrom;
   a second end, opposite to said first end, having a recess formed therein, wherein said recess includes a shape which is complementary to that of said protrusion; and
   an interior surface having a plurality of cavities, wherein said plurality of cavities includes a first type shaped for receiving a negative end of an electrochemical cell and a second different type shaped for receiving a positive end of an electrochemical cell.

9. A module, for holding electrochemical cells, comprising:
   a cell holding board, for retaining the cells, having a first surface and a second surface opposite to said first surface, said second surface including a plurality of recesses therein, said plurality of recesses including a first type of recess having a first shape, and a second type of recess having a second shape which is different than said first shape; and
   a plurality of electric connectors, for connecting the cells, including a first type of connector having a shape complementary to said first shape, and a second type of connector having a shape complementary to said second shape.

10. A cell assembly, for holding a plurality of electrochemical cells each having a positive end and a negative end having a different shape than the positive end, comprising:
- a first cell holding board having a plurality of cavities therein, said plurality of cavities including a first type shaped for receiving the negative end of an electrochemical cell and a second typed different shaped for receiving the positive end of an electrochemical cell;
- a second cell holding board having a plurality of cavities therein, said plurality of cavities in said second holding board including said first type shaped for receiving the negative end of an electrochemical cell and said second type shaped for receiving the positive end of an electrochemical cell, said second cell holding board being arranged opposite to said first cell holding board so that a cavity of said first type in said first cell holding board is opposite a cavity of said second type in said second cell holding board.

11. A cell holding board, for retaining electrochemical cells which are connected by electrical connectors, comprising:
- a first surface including cavities therein for receiving the electrochemical cells, wherein said-cavities include a first type shaped for receiving a negative end of an electrochemical cell and a second different type shaped for receiving a positive end of an electrochemical cell;
- a second surface opposite to said first surface, and including recesses therein for receiving the electrical connectors.

12. An electrochemical cell module comprising:
- a cell assembly having a first end, and a second end opposite to said first end;
- a first end cap, connected to said first end of said cell assembly;
- a second end cap, connected to said second end of said cell assembly so as to be spaced by a first distance from said first end cap;
- a shell located between said first end cap and said second end cap, said shell (80) having a height which is less than said first distance.

13. An electrochemical cell module comprising:
- a cell assembly including a plurality of electrochemical cells and at least one cell holding board which retains said cells at a predetermined spacing, said cell holding board including a plurality of holes therein for directing fluid flow;
- an end cap attached to said cell holding board so as to form a fluid manifold therebetween, said end cap having at least one fluid intake port therein,
  - wherein said end cap is spaced from said cell holding board, said plurality of holes is arranged, and said predetermined spacing between said cells is selected, such that fluid entering said intake port at a first velocity maintains a uniform temperature distribution within each cell.

* * * * *